(12) United States Patent
Schwarzmueller et al.

(10) Patent No.: US 8,306,489 B2
(45) Date of Patent: Nov. 6, 2012

(54) CIRCUIT FOR A LOOP ANTENNA AND METHOD FOR TUNING

(75) Inventors: Marco Schwarzmueller, Heilbronn (DE); Holger Schulz, Erbach (DE); Werner Blatz, Leingarten (DE); Uwe Erben, Ulm (DE)

(73) Assignee: Atmel Corporation, San Jose, CA (US)

( * ) Notice: Subject to any disclaimer, the term of this patent is extended or adjusted under 35 U.S.C. 154(b) by 245 days.

(21) Appl. No.: 12/578,919

(22) Filed: Oct. 14, 2009

(65) Prior Publication Data

US 2010/0124890 A1 May 20, 2010

Related U.S. Application Data

(60) Provisional application No. 61/166,171, filed on Apr. 2, 2009.

(30) Foreign Application Priority Data

Oct. 27, 2008 (DE) .......................... 10 2008 053 296

(51) Int. Cl.
*H04B 1/04* (2006.01)
*H01Q 11/12* (2006.01)
(52) U.S. Cl. ..................................... 455/123; 455/193.1
(58) Field of Classification Search .................. 455/107, 455/121, 123, 129, 120, 193.1, 193.3
See application file for complete search history.

(56) References Cited

U.S. PATENT DOCUMENTS 5,136,719 A * 8/1992 Gaskill et al. .............. 455/193.1
5,225,847 A * 7/1993 Roberts et al. ................ 343/745
5,301,358 A * 4/1994 Gaskill et al. .............. 455/193.2
5,491,715 A 2/1996 Flaxl (Continued)

FOREIGN PATENT DOCUMENTS

DE 694 26 013 T2 5/2001

(Continued)

OTHER PUBLICATIONS

Office Action and English Translation for Korean Patent Application 10-2009-102417, Apr. 15, 2011.

(Continued)

*Primary Examiner* — Blane J Jackson
(74) *Attorney, Agent, or Firm* — Baker Botts L.L.P.

(57) ABSTRACT

A circuit for a loop antenna having a first antenna terminal and a second antenna terminal with an antenna impedance, and method for tuning an overall impedance that has an antenna impedance of a loop antenna and a tuning impedance, with an output amplifier for amplifying a transmit signal that has an output for connection to the first antenna terminal of the loop antenna, with a tuning device designed for automatic tuning that has a terminal, which is separated from the output of the output amplifier for connection to the second antenna terminal, in which the tuning device has an adjustable tuning impedance that is connected to the terminal, in which the tuning device has a measurement device that is connected to the tuning impedance in order to measure a voltage amplitude across the tuning impedance, in which the tuning device has a computing unit that is connected to the measurement device and the adjustable tuning impedance, and in which the computing unit is designed for automatic adjustment of the tuning impedance based on evaluation of the voltage amplitude and the tuning impedance.

20 Claims, 4 Drawing Sheets

U.S. PATENT DOCUMENTS

| | | | | |
|---|---|---|---|---|
| 5,499,180 | A * | 3/1996 | Ammirato et al. | 715/204 |
| 6,081,700 | A * | 6/2000 | Salvi et al. | 455/193.3 |
| 6,574,454 | B1 * | 6/2003 | Tuttle | 455/41.1 |
| 6,658,239 | B1 * | 12/2003 | Elder et al. | 455/121 |
| 6,907,234 | B2 * | 6/2005 | Karr et al. | 455/193.1 |
| 6,978,126 | B1 | 12/2005 | Blaker et al. | |
| 7,469,129 | B2 * | 12/2008 | Blaker et al. | 455/107 |
| 7,747,228 | B2 * | 6/2010 | Kasha et al. | 455/91 |
| 8,055,219 | B2 * | 11/2011 | Jenkins et al. | 455/121 |
| 2009/0176465 | A1 * | 7/2009 | Jenkins et al. | 455/121 |

FOREIGN PATENT DOCUMENTS

| | | |
|---|---|---|
| EP | 0 663 724 B1 | 9/2000 |

OTHER PUBLICATIONS

Kim & Shang, KIPO's Notice of Preliminary Rejection (English Translation), Korean Patent Application No. 10-2009-102417, 7 pages, Dec. 30, 2011.

Chinese Office Action and English Translation of Text of the First Office Action, Chinese Patent Application No. 200910209106.1, filed Oct. 27, 2009; Ref. USBBL69259-gy, 2012032400038430 (6 pgs).

Rothammel, Krische; Antennenbuch "Antenna Book", vol. 12—updated and expanded 2001 Edition, (8 pages). See, e.g., Applicants' Specification at p. 1.

* cited by examiner

CIRCUIT FOR A LOOP ANTENNA AND METHOD FOR TUNING

This nonprovisional application claims priority to German Patent Application No. 10 2008 053 296.7, which was filed in Germany on Oct. 27, 2008, and to U.S. Provisional Application No. 61/166,171, which was filed on Apr. 2, 2009, and which are both herein incorporated by reference.

BACKGROUND OF THE INVENTION

1. Field of the Invention

The present invention relates to a circuit for a loop antenna and a method for tuning.

2. Description of the Background Art

Loop antennas are known from the "Antennenbuch," (Antenna Book) by Rothammel, Krischke, pages 67, 318, 319, 332, 333, $12^{th}$ edition, 2001. Loop antennas are closed (magnetic) antennas with loop-shaped elements. With antenna loops that are small in comparison to the wavelength, they are also called frame antennas or magnetic antennas. For the frequency f=0, the impedance is also zero. For increasing frequency, the impedance behavior is inductive. This impedance behavior extends only to half-wave resonance, however, which is to say to a range of half waves, after which the impedance behavior becomes capacitive. For this reason, only small loops (up to a length of approximately a quarter wave) are called magnetic antennas. Possible geometric shapes of the loops include circular element, square element, diamond or rhombus, triangular element, rectangular element, polygonal element, and elliptical element. Small loop antennas have an inductive impedance with a first terminal and a second terminal. The inductive impedance is connected to a capacitive impedance, for example a number of capacitors (one or several), to form a resonant circuit.

Known from EP 0 663 724 B1, which corresponds to U.S. Pat. No. 5,491,715, is a method for matching the resonant frequency of an antenna resonant circuit to the output frequency of a transmitter output stage. The antenna resonant circuit contains a tuning circuit that can be operated in such a manner that it modifies the resonant frequency of the resonant circuit. The antenna resonant circuit has a phase correlation signal at its output. The phase of the phase correlation signal with respect to the supplied signal has a known relationship to the frequency difference between the resonant frequency and the supplied signal. The supplied signal and the phase correlation signal are received in a phase comparator. The resonant frequency of the resonant circuit is established as the response to the received output signal of the phase comparator.

SUMMARY OF THE INVENTION

It is therefore an object of the present invention to improve a circuit for a loop antenna. Accordingly, a circuit for a loop antenna is provided. The loop antenna can have a first antenna terminal and a second antenna terminal. An antenna impedance of the loop antenna has at least one inductance formed by at least one loop.

The circuit has an output amplifier for amplifying a transmit signal. The output amplifier has an output for connection to the first antenna terminal of the loop antenna.

The circuit can have a tuning device that has a terminal for connection to the second antenna terminal. The terminal of the tuning device is separated from the output of the output amplifier. The tuning device has an adjustable tuning impedance that is connected to the terminal of the tuning device. The tuning device is designed to automatically tune. The tuning impedance and the antenna impedance are components of an effective overall impedance in this regard. The tuning impedance preferably has at least one adjustable capacitance, for example as a capacitor bank.

The tuning device can have a measurement device. The measurement device can be connected to the tuning impedance in order to measure a voltage amplitude across the tuning impedance.

The tuning device can have a computing unit that can be connected to the measurement device and the adjustable tuning impedance. The computing unit can be designed for automatic adjustment of the tuning impedance based on evaluation of the voltage amplitude and the tuning impedance, preferably by means of a program sequence (implemented in hardware and/or software).

The invention has the additional object of specifying a method for tuning a loop antenna that is improved to the greatest degree possible. Accordingly, a method for tuning a loop antenna connected to a circuit for a maximal radiated power is provided. The loop antenna can have an antenna impedance and a tuning device of the circuit a tuning impedance.

In the method, an amplified signal is output by means of an output amplifier that is connected to a first antenna terminal of the loop antenna. The amplified signal can have the nature of a sinusoidal signal.

In the method, the following steps for determining a maximum of the radiated power are performed repeatedly: (a) detecting a voltage amplitude across the tuning impedance, wherein the tuning impedance can be connected to a second antenna terminal of the loop antenna; (b) evaluating the voltage amplitude that has been detected and the tuning impedance, and (c) changing the tuning impedance.

The results can be stored at least temporarily for the evaluation. Advantageously, the evaluation results that have been determined are compared to one another using a greater-than/less-than comparison.

Another aspect of the invention is a radio system with an above-described circuit. The radio system has a loop antenna with a first antenna terminal and a second antenna terminal. The tuning impedance of the tuning device is designed as an adjustable tuning capacitance. Together with at least one other capacitor and the inductance of a loop of the loop antenna, the adjustable tuning capacitance forms a resonant circuit.

The radio system can have a matching network for matching the output impedance of the output amplifier to the antenna impedance and the tuning impedance of the overall impedance, wherein the matching network is located between the output of the output amplifier and the first antenna terminal.

The embodiments described below relate to the radio system and the method for tuning as well as to the circuit. In this regard, functional features of the circuit and radio system derive from corresponding features of the method. Features of the method derive from functions of the circuit or radio system.

In an embodiment, provision is made for the evaluation that the computing unit can be designed to multiply a value associated with the current tuning impedance by the voltage amplitude. For example, the computing unit can have a computing core of a microcontroller for multiplication. The value associated with the current tuning impedance is, for example, the current capacitance value of the tuning impedance or the current capacitance value of a parallel circuit comprising the tuning impedance and another capacitance.

Provision can be made that the computing unit is designed to determine a maximum of the (mathematical) product as the result of the multiplication. To this end, multiple products associated with different tuning impedance values are evaluated in combination with one another—for example by means of a greater-than/less-than comparison.

According to an embodiment, provision can be made that the computing unit has a table of values with values associated with the tuning impedance values for the evaluation. The values associated with the tuning impedance values can advantageously be written in the table of values. Preferably, the values are read out from the table of values and evaluated with the application of a control signal associated with the relevant tuning impedance value. Preferably, provision is made that the values are multiplication factors for multiplication with the voltage amplitude. The values can also be called correction values. The computing unit can have a table of values (LUT, Look Up Table) for output. Preferably, a value associated with the tuning impedance is entered in the table of values, so that when a control signal is applied, the table of values outputs an output value associated with the current tuning impedance, for example a multiplication factor, for evaluation.

The measurement device can be designed to produce a DC voltage associated with the voltage amplitude. In an especially advantageous manner, the measurement device is designed to convert the DC voltage into a digital value, in particular by means of a comparator and a digital-to-analog converter connected to one input of the comparator.

The computing unit can be a state machine, for example. According to one embodiment, the computing unit is designed to be programmable, in particular as a microcontroller. The computing unit is connected to the measurement device and the adjustable tuning impedance.

In an embodiment, the measurement device is designed to set a sensitivity of the measurement device. Preferably, the computing unit can be connected to the measurement device for setting the sensitivity of the measurement device. The measurement device can have an adjustable capacitive voltage divider, which is preferably connected to one input of the measurement device, for setting the sensitivity. The division ratio of the adjustable capacitive voltage divider is preferably settable by the computing unit.

Further, the measurement device can be switched off. The computing unit can be connected to the measurement device to switch the measurement device off during transmit operation.

The tuning device can be connected to the output amplifier and/or a transmitter circuit. In an advantageous manner, control outputs of the computing unit are connected to the output amplifier and/or to the transmitter circuit for purposes of connection. The tuning device is preferably configured for controlling the output amplifier and/or the transmitter circuit for adjusting an output amplitude and/or an output frequency at the output of the output amplifier.

In an embodiment, the tuning device can be designed to reduce, in particular to minimize, the output power of the output amplifier. The tuning device is configured to detect possible overdriving prior to the determination of the maximum of the radiated power during the determination process, and to limit the output power of the output amplifier in the event of overdriving by setting a register value.

The tuning method can be configured to determine the voltage amplitude across the tuning impedance at reduced or minimized output power of the output amplifier and to establish a maximum permissible gain value of the output amplifier for the subsequent determination of the maximum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
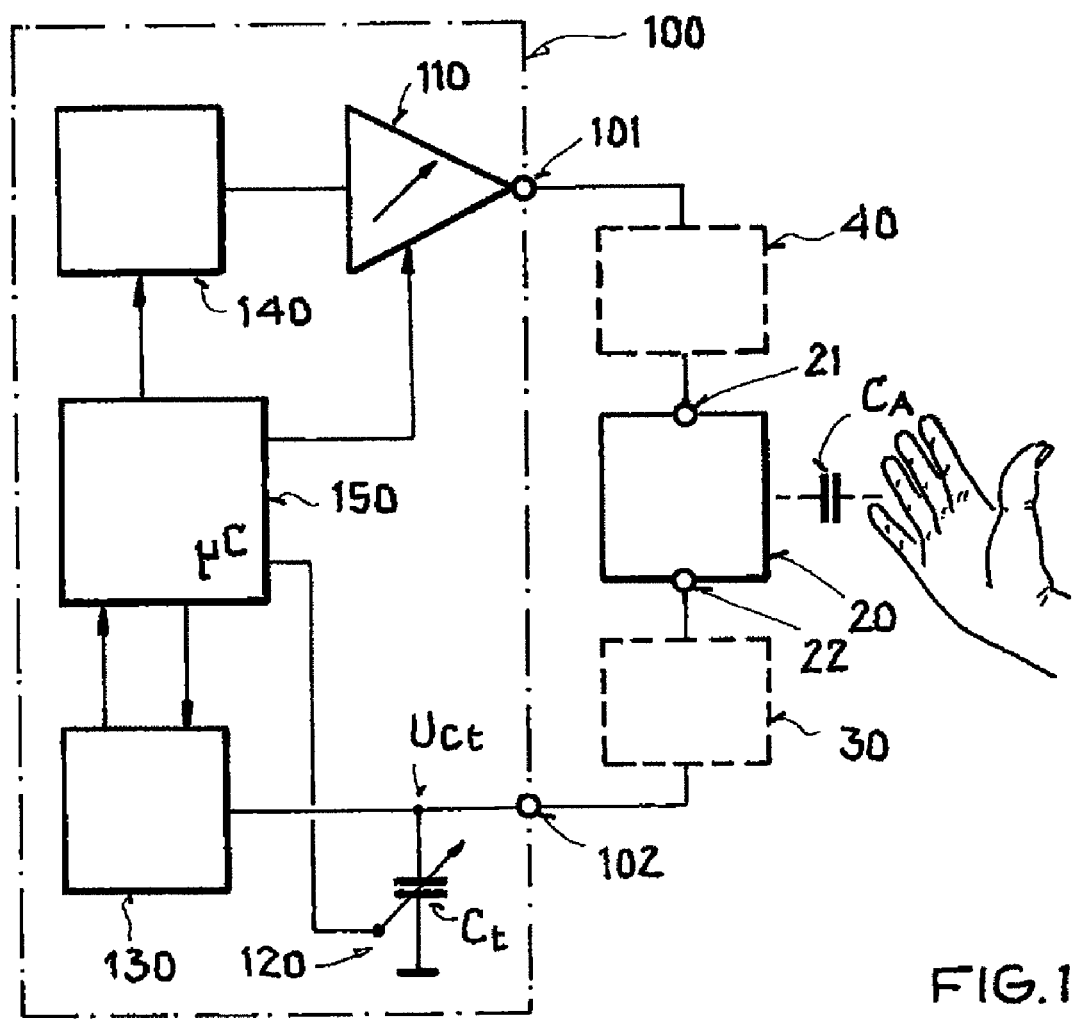
FIG. 1 is a schematic block diagram of a radio system with a monolithic integrated circuit.

Shown schematically in FIG. 1 is a block diagram of a radio system. A monolithic integrated circuit 100 has an output amplifier 110, which has an output 101. The circuit 100 also has an adjustable tuning capacitance 120 as tuning impedance, which is connected to an input 102. The adjustable tuning impedance 120 serves here to match the antenna circuit for a maximization of the radiated power. The output 101 of the output amplifier 110 is connected via a matching network 40 to a first terminal 21 of a loop antenna 20. The input 102 that is connected to the tuning capacitance 120 is connected to a second terminal 22 of the loop antenna 20 through another impedance 30.

A transmitter circuit 140 for generating a transmit signal to be amplified is connected to one input of the output amplifier 110. The output amplifier 110 in FIG. 1 is specified for an output power of −10 dBm to +14 dBm in this case. In this regard, different output powers may require a different matching network for the loop antenna 20. A measurement device 130 for determining a voltage amplitude $U_{Ct}$ across the tuning capacitance 120 is connected to the tuning capacitance 120. The measurement device 130 has, e.g., a voltage comparator for determining the voltage amplitude $U_{Ct}$.

The circuit has a computing unit 150, for example a microcontroller. An input of the computing unit 150 is connected to an output of the measurement device 130, with the computing unit being configured to evaluate a digital value, associated with the voltage amplitude $U_{Ct}$, that is output by the measurement device 130. The computing unit 150 has a control output for controlling the transmitter circuit 140, in particular for controlling the transmit frequency. The computing unit has another control output for controlling the output amplifier 110 in order to set the gain. The computing unit 150 has another control output for setting a sensitivity of the measurement device 130. The computing unit 150 has another control output for adjusting the tuning capacitance 120. In the example embodiment from FIG. 1, the computing unit 150 is connected for the purpose of control to the tuning capacitance 120 and/or the measurement device 130 and/or the transmitter circuit 140 and/or the output amplifier 110.

Figure 2:
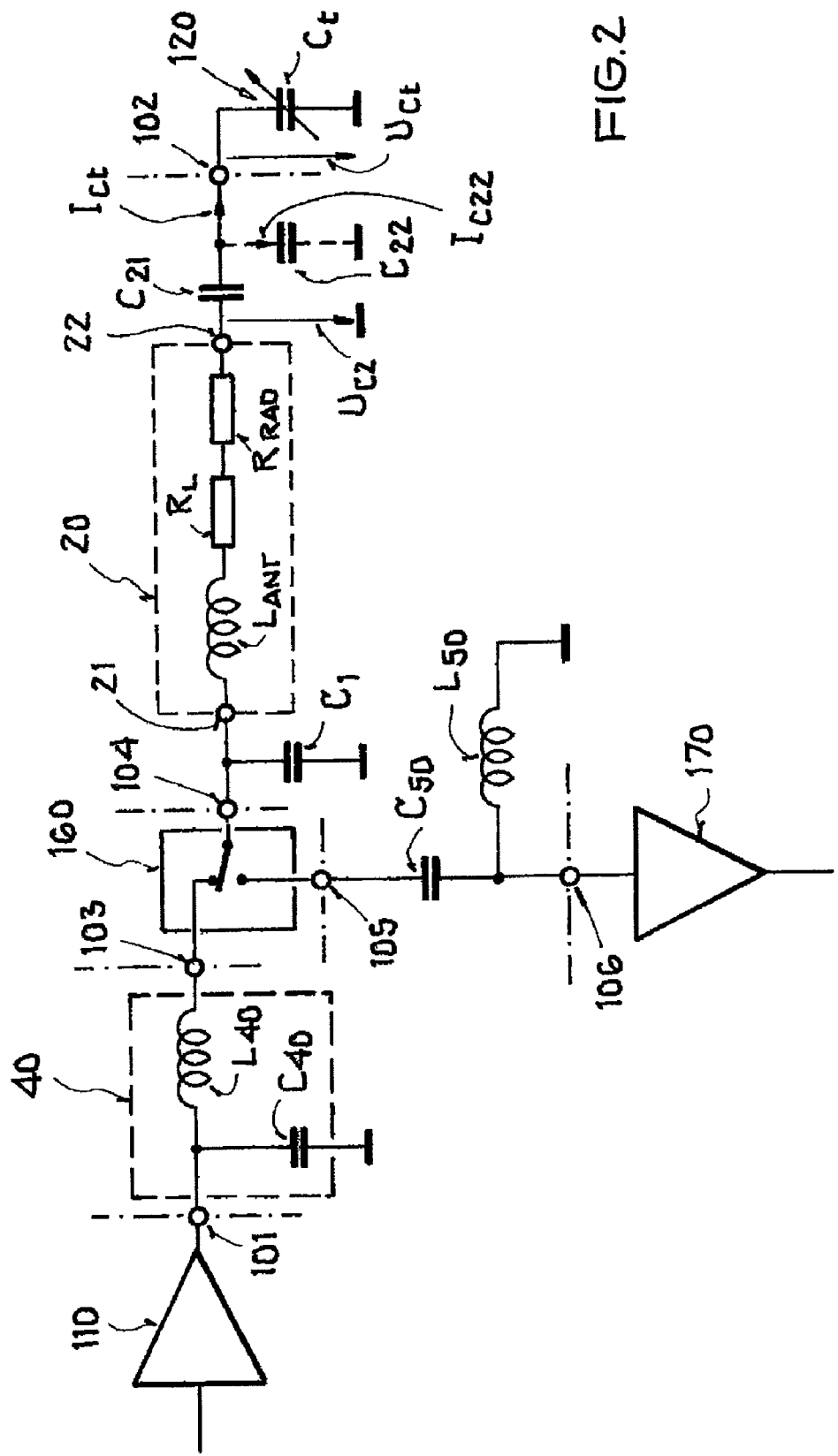
FIG. 2 is a schematic equivalent circuit diagram of a radio system.

FIG. 2 shows a monolithic integrated circuit with its terminals 101, 102, 103, 104, 105, 106 and an external connection to external components, which together form a radio system that is shown in the form of a schematic equivalent circuit. A loop antenna 20 has an inductance $L_{ANT}$. Ohmic losses are represented by the ohmic resistor $R_L$. The desired radiated power is symbolized by the resistor $R_{RAD}$ in the equivalent schematic diagram. The loop antenna 20 has a first antenna terminal 21 and a second antenna terminal 22.

The output amplifier 110 is connected to the first antenna terminal 21 of the loop antenna 20 via the output 101, through a matching network 40 with a (SMD) capacitor C40 and an inductor L40, through the terminals 103 and 104, and through the high-frequency switch 160. Also connected to the first antenna terminal 21 is a (SMD) capacitor C1, which connects the first antenna terminal 21 to ground. A (SMD) capacitor C21 is connected to the second antenna terminal 22. The second antenna terminal 22 is also connected to ground through the (SMD) capacitor C21 and a parallel circuit of the (SMD) capacitor C22 and the monolithically integrated tuning capacitance 120 (Ct). Through the ground connection, the inductance $L_{ANT}$ and the capacitors C1, C21, C22, and Ct form a (damped) resonant circuit whose resonant frequency depends on the inductance $L_{ANT}$ and the capacitors C1, C21, C22, and Ct.

As shown in FIG. 1, the resonant circuit with the loop antenna 20 is not decoupled from the environment, so that an additional parasitic capacitance $C_A$ is shown schematically in FIG. 1. The parasitic capacitance $C_A$ here stands for all possible parasitic capacitances, for example to a housing (not shown), the presence of a metallic object (not shown), or a hand, etc., which could influence the resonance of the resonant circuit. For a given transmit frequency of a transmit signal and/or receive frequency of a receive signal, therefore, the circuit is tuned for a greatest possible transmit power by adjusting the tuning capacitance 120. The inductance $L_{ANT}$ and the capacitors C1, C21, C22, Ct, and $C_A$ make up an overall impedance that is comprised of the individual impedances. The overall impedance thus contains at least the antenna impedance ($R_L$, $L_{ANT}$) and the tuning impedance (Ct).

A loop of the loop antenna 20 implemented on a circuit carrier defines the inductance $L_{ANT}$ and the ohmic resistance $R_L$ of the loop antenna 20 here. The circuit 100 is configured here to automatically adjust the tuning capacitance 120 as a function of a voltage $U_{Ct}$ across the tuning capacitance 120 for the purpose of tuning. The special advantage of a fully automatic tuning of the overall impedance is attained by this means through the circuit in the example embodiment shown in FIG. 2.

The radiated power in the example embodiment in FIG. 2 can be calculated as:

$$P_{rad} = I^2 \cdot R_{rad} \quad (1)$$

Accordingly, the current I through the loop antenna 20 must be maximized for maximum radiated power Prad. The following applies to the current I through the loop antenna 20:

$$I = I_{C22} + I_{Ct} \quad (2)$$

where Ic22 is the current through the capacitor C22 and Ict is the current through the tuning capacitance Ct, with $$I_{C22} = C_{22} \frac{dU_{Ct}}{dt} \quad (3)$$

and $$I_{Ct} = C_t \frac{dU_{Ct}}{dt}. \quad (4)$$

It follows from this that $$I = (C_{22} + C_t)\frac{dU_{Ct}}{dt} = (C_{22} + C_t) \cdot U_{Ct} \cdot const, \quad (5)$$

and, substituted into (1), this results in $$P_{rad} = (C_{22}+C_t)^2 \cdot U^2_{Ct} \cdot const^2 \cdot R_{rad}. \quad (6)$$

Here, the value C22 is known and constant. The value Ct is known, since this is adjusted for the measurement. Both the value for Ct and the voltage amplitude Uct are evaluated. Thus, the maximum is determined by means of the value for Ct and the voltage amplitude Uct. This is applicable to a first approximation for Q values of the loop antenna 20 greater than or equal to ten. The voltage amplitude Uct is measured. The constant const and the radiation resistance Rrad are likewise constant.

Accordingly, Prad is then maximal when $$(C_{22}+C_t)^2 \cdot U^2_{Ct} \quad (7)$$

is maximal. Accordingly, the maximum of the product [(C22+Ct)·Uct] of the tuning impedance C22∥Ct and the voltage amplitude Ct is determined in order to determine the maximum of the radiated power.

In the example embodiment shown in FIG. 2, C22=0 or C22<Ct. In this case, the dominant term for maximizing the radiated power can be simplified to Ct·Uct. In the case of relatively small resolutions for adjusting the tuning capacitance Ct, this simplification does not affect the result. However, this simplification results in a significant reduction in the computational effort. For calculating the maximum, the computing unit 150 has, e.g., a table of values in which are stored values associated with tuning impedances. In each case, a value for the currently set tuning capacitance Ct is read from the table and is multiplied by the measured voltage amplitude Uct associated with the tuning capacitance. The product, as the result of this multiplication, can subsequently be compared with other products. In this regard, it is also possible to account for the parallel-connected capacitance C22 in the table of values. For example, the values can be programmed through an interface (not shown) of the computing unit 150.

The circuit 100 in FIG. 2 achieves a determination of the maximum of the radiated power that is especially robust against external interfering influences. Since it is a relative measurement, the absolute value of the voltage amplitude Uct is not required for determining the maximum. Interferences that affect the absolute value of the maximum are thus masked out. Moreover, the measurement tap at the tuning impedance Ct permits an especially direct measurement of a quantity Uct that is indicative of the resonance condition. The number of possible measurement errors is reduced. Moreover, the measurement impedance of a high-resistance measurement tap with small parasitic measurement capacitances will scarcely affect the antenna circuit. The measurement of the voltage amplitude Uct results in the surprising effect that high measurement resolution is not required for determining the maximum of the radiated power, so that the measurement device 130 from FIG. 1 can be of simple design and thus can be integrated easily into a semiconductor circuit.

Calculations for maximizing the radiated power—such as those explained in the foregoing example—can be carried out in a method sequence of a microcontroller as the computing unit 150. Alternatively, the calculation can also be implemented in hardware, for example by means of a state machine. For example, the input value of the digital-to-analog converter 132 can be generated by means of a counter, wherein the counter is stopped upon a change in the output signal of the comparator 133 and the counter value is compared in a memory to a previous value. If the counter value is larger, the counter value and the associated value of the tuning capacitance Ct are stored.

The connection of the tuning capacitance 120 to the second terminal 21 of the loop antenna 20, and thus to the high-resistance connection point of the loop antenna 20, achieves the surprising effect that the frequency response of the radiated power is flat and the absolute value of the radiated power is high. Furthermore, using the above-described circuit from the example embodiment in FIG. 2, an adjustment can be achieved within a few milliseconds—in particular, in less than 1.3 milliseconds.

The overall impedance achieved by tuning for a maximized radiated power preferably remains unchanged even in receive mode here. In receive mode, the first antenna terminal 21 of the loop antenna 20 is connected by the high-frequency switch 160 to an input 106 of an input amplifier 107 (LNA, Low Noise Amplifier) through a matching network having a (SMD) capacitor C50 and an inductor L50.

Figure 3:
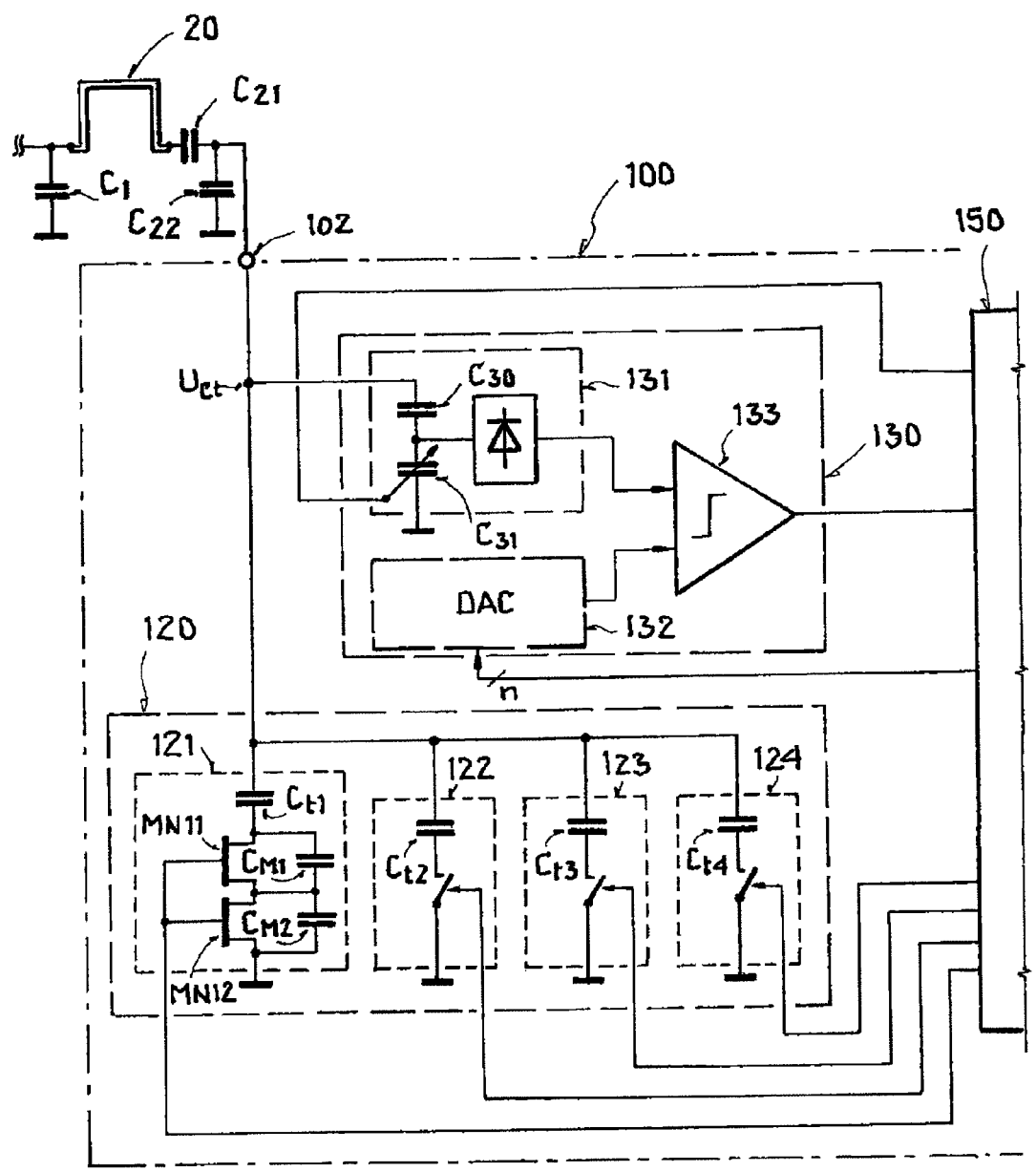
FIG. 3 is a schematic block diagram of a circuit.

FIG. 3 shows a measurement device 130 where an output of the measurement device 130 is connected to a computing unit 150 for evaluation. The measurement device 130 has a detector circuit 131 with a capacitive voltage divider having the capacitor C30 and the adjustable capacitor C31 for setting the sensitivity of the measurement device 130. The detector circuit 131 has the function of producing a DC voltage associated with the voltage amplitude $U_{Ct}$ by rectification, and if necessary filtering. The DC voltage arrives at one input of a comparator 133 of the measurement device 130. The output value of a digital-to-analog converter (DAC) 132, which converts an n-bit wide digital value (for example, 4 bits or 5 bits wide) into an analog value, is supplied to the other input of the comparator 133 for the comparison.

To determine the voltage $U_{Ct}$ across a tuning capacitance 120, the computing unit 150 adjusts the output voltage of the digital-to-analog converter 132 by means of the n-bit wide digital value until the output signal of the comparator 133 changes. The associated n-bit wide digital value is stored. For a new value of the tuning capacitance Ct, the output voltage of the digital-to-analog converter 132 is repeatedly changed until the output signal of the comparator 133 changes again. The new associated n-bit wide digital value is likewise stored.

If the voltage amplitude $U_{Ct}$ lies outside the current measurement range, the sensitivity of the measurement device 130 can be changed through an adjustment of the capacitor C31 by the computing unit 150. By means of the voltage dividing function of the capacitors C30 and C31, voltage amplitudes can be determined even though the voltage amplitudes exceed the permissible reverse voltage of semiconductor components of the detector circuit 131.

Moreover, FIG. 3 schematically shows an adjustable tuning capacitance 120 designed as a capacitor bank. The tuning capacitance 120 is adjusted by the computing unit 150 by means of four lines. Depending on the required tuning range or tuning resolution, more than four lines may also be provided. A first capacitance device 121 is shown in detail. The capacitance device 121 has two field effect transistors MN11 and MN12, connected in series for a higher permissible reverse voltage, as switching transistors. The switching transistors MN11 and MN12 are connected to the capacitor Ct1 and ground in order to connect and disconnect the capacitor Ct1. Connected in parallel to each switching transistor MN11 and MN12 is a small capacitor CM1 or CM2, which is considerably smaller than the capacitor Ct1 and which divides the voltage amplitude across the drain-source path of the switching transistor MN11, MN12 through capacitive voltage division in the switched-off state of the switching transistor MN11, MN12.

The other capacitance devices 122, 123, 124 are of analogous design to the capacitance device 121, but have a different capacitor Ct2, Ct3, or Ct4. For example, the capacitance device 122 comprises two circuit sections corresponding to the capacitance device 121, which are connected in parallel. The capacitance device 123 can comprise four circuit sections connected in parallel, and the capacitance device 124 can comprise eight circuit sections connected in parallel, in order to permit adjustment in sixteen stages (corresponding to four bits).

Figure 4:
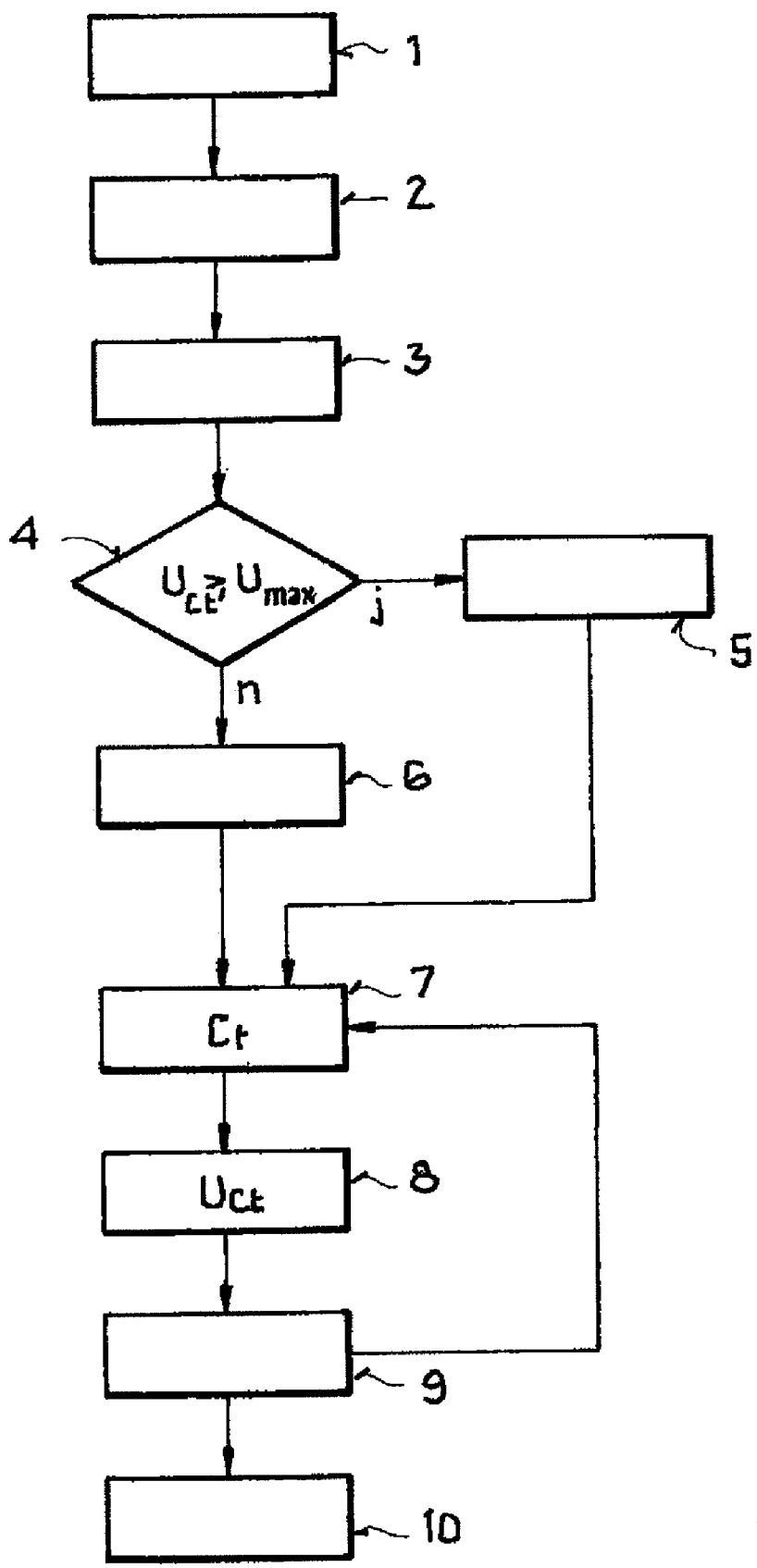
FIG. 4 is a schematic flow diagram of a method sequence.

FIG. 4 schematically shows a possible method sequence for tuning an antenna circuit for a maximization of the radiated power of the loop antenna using a sequence diagram. An overall impedance here is composed of at least an antenna impedance of a loop antenna and a tuning impedance of a tuning device.

In a first step, the output power of an output amplifier is set to a low value, the lowest value when possible, by adjusting the gain. The output power in this case is −10 dBm, for example. The output amplifier, which is connected to a first antenna terminal, outputs an amplified signal.

In step 2, an initial value of a tuning capacitance (of the tuning impedance) is set. The initial value is, for example, the smallest capacitor value. Alternatively, the initial value is a default value determined by a measurement device, which compensates the tolerances of external SMD capacitors. Alternatively, the initial value is a value for a maximum transmit power determined in a preceding tuning.

In the subsequent step 3, the voltage amplitude $U_{Ct}$ across the tuning capacitance is determined.

In step 4, an expected voltage amplitude $U_C{}'$ for a predefined (desired) transmit power is calculated and is compared to a permissible maximum value Umax. If the expected voltage amplitude $U_{Ct}{}'$ exceeds the maximum value Umax, a flag is set in step 5 and the output amplifier is driven to the maximum permissible level. If the expected voltage amplitude $U_{Ct}{}'$ does not exceed the maximum value Umax, in step 6 the output amplifier is driven for the predefined (desired) transmit power.

The subsequent steps 7, 8, and 9 are repeated to determine a maximum of the radiated power until all possible values are determined or until a termination condition is reached.

First, in step 7—if necessary—the tuning impedance Ct can be changed. In contrast, when step 7 is repeated in the method loop, a change in the tuning impedance Ct is required.

In step 8, a determination of a voltage amplitude $U_{Ct}$ across the tuning impedance Ct takes place. An absolute determination of the voltage amplitude $U_{Ct}$ in order to determine the maximum of the radiated power is not required here, but rather only a relative determination of the measured voltage amplitudes with respect to one another as a function of the tuning impedance Ct.

In step 9, a determination of a relative value associated with the radiated power from the measured voltage amplitude $U_{Ct}$ takes place by the means that the value associated with the voltage amplitude $U_{Ct}$ is evaluated together with a value that depends on the tuning capacitance. For example, the value of the voltage amplitude Uct and the value of the tuning capacitance are multiplied together. This can also be referred to as correction of the voltage amplitude value. The product as the result of the multiplication here has a maximum at the specific point—which is to say, for the specific tuning capacitance Ct—which the radiated power becomes maximal.

Once the relative maximum of the radiated power is determined by repeating the steps 7, 8, and 9, the tuning capacitance is set to the capacitance value for maximum radiated power in step 10.

The invention is not restricted to the variant embodiments shown in FIGS. 1 through 4. For example, it is possible to provide a greater resolution of the measurement device or a finer adjustment of the tuning capacitance. It is also possible to provide an inductive component for the tuning impedance.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit comprising:
   an output amplifier configured to amplify a transmit signal, the output amplifier having an output connectable to a first antenna terminal of a loop antenna; and
   a tuning device for automatic tuning, the tuning device comprising:
      a terminal that is separated from the output of the output amplifier and that is connectable to a second antenna terminal of the loop antenna;
      an adjustable tuning impedance that is connectable to the second terminal;
      a measurement device that is connectable to the adjustable tuning impedance, the measurement device operable to measure a voltage amplitude across the adjustable tuning impedance, the measurement device operable to be switched off; and
      a computing unit that is connectable to the measurement device and the adjustable tuning impedance, the computing unit configured to:
         automatically adjust the adjustable tuning impedance based on an evaluation of the voltage amplitude and the adjustable tuning impedance; and
         switch off the measurement device during a transmit operation.

2. The circuit of claim 1, wherein the evaluation comprises multiplying, by the computing unit, a value associated with a current tuning impedance by the voltage amplitude.

3. The circuit of claim 2, wherein the computing unit is further configured to determine a maximum of a product of the multiplication.

4. The circuit of claim 1, wherein the computing unit comprises a table of values associated with the adjustable tuning impedance for the evaluation.

5. The circuit of claim 4, wherein the values are multiplication factors for multiplication with the voltage amplitude.

6. The circuit of claim 1, wherein:
   a sensitivity of the measurement device is settable; and
   the computing unit is operable to set the sensitivity of the measurement device.

7. The circuit of claim 1, wherein:
   the tuning device is connectable to the output amplifier; and
   the tuning device is configured to control the output amplifier, the controlling comprising adjusting an output amplitude or an output frequency of the transmit signal at the output of the output amplifier.

8. The circuit of claim 1, wherein:
   the tuning device is connectable to a transmitter circuit; and
   the tuning device is operable to control the transmitter circuit in order to adjust an output amplitude and an output frequency of the transmit signal at the output of the output amplifier.

9. A radio system comprising:
   a loop antenna having a first antenna terminal and a second antenna terminal; and
   a circuit comprising:
      an output amplifier configured to amplify a transmit signal, the output amplifier having an output connectable to the first antenna terminal of the loop antenna; and
      a tuning device for automatic tuning, the tuning device comprising:
         a terminal that is separated from the output of the output amplifier and that is connectable to the second antenna terminal;
         an adjustable tuning impedance that is connectable to the second antenna terminal;
         a measurement device that is connectable to the adjustable tuning impedance, the measurement device operable to measure a voltage amplitude across the adjustable tuning impedance, the measurement device operable to be switched off;
         a computing unit that is connectable to the measurement device and the adjustable tuning impedance, the computing unit is configured to:
            automatically adjust the adjustable tuning impedance based on an evaluation of the voltage amplitude and the adjustable tuning impedance; and
            switch off the measurement device during a transmit operation.

10. The radio system of claim 9, wherein the evaluation comprises multiplying, by the computing unit, a value associated with a current tuning impedance by the voltage amplitude.

11. The radio system of claim 9, wherein the computing unit comprises a table of values associated with the adjustable tuning impedance for the evaluation.

12. The radio system of claim 11, wherein the values are multiplication factors for multiplication with the voltage amplitude.

13. The radio system of claim 9, wherein:
   a sensitivity of the measurement device is settable; and
   the computing unit is operable to set the sensitivity of the measurement device.

14. The radio system of claim 9, wherein:
   the tuning device is connectable to the output amplifier; and
   the tuning device is configured to control the output amplifier, the controlling comprising adjusting an output amplitude or an output frequency of the transmit signal at the output of the output amplifier.

15. The radio system of claim 9, wherein:
   the tuning device is connectable to a transmitter circuit; and
   the tuning device is operable to control the transmitter circuit in order to adjust an output amplitude and an output frequency of the transmit signal at the output of the output amplifier.

16. A method comprising:
   outputting an amplified signal via an output amplifier that is connectable to a first antenna terminal of a loop antenna; and
   determining a maximum of a radiated power by performing the following steps repeatedly:
      detecting, by a measurement device, a voltage amplitude across an adjustable tuning impedance, wherein the adjustable tuning impedance is connectable to a second antenna terminal of the loop antenna, the measurement device operable to be switched off;
      evaluating, by a computing unit coupled to the measurement device, the detected voltage amplitude and the adjustable tuning impedance;
      switching off, by the computing unit, the measurement device during a transmit operation; and adjusting, by the computing unit, the adjustable tuning impedance based on the evaluation.

17. The method of claim 16, wherein the voltage amplitude is multiplied by a multiplication factor associated with a current tuning impedance for the evaluation.

18. The method of claim 17, wherein a maximum of a product of the multiplication is determined for the evaluation.

19. The method of claim 16, wherein, prior to the steps for determining the maximum of the radiated power, an output power of the output amplifier is reduced or minimized, the voltage amplitude across the adjustable tuning impedance is determined, and a maximum permissible gain value of the output amplifier is established for a subsequent determination of the maximum of the radiated power.

20. The radio system of claim 16, wherein the computing unit is further configured to determine a maximum of a product of the multiplication.

* * * * *